UNITED STATES PATENT OFFICE.

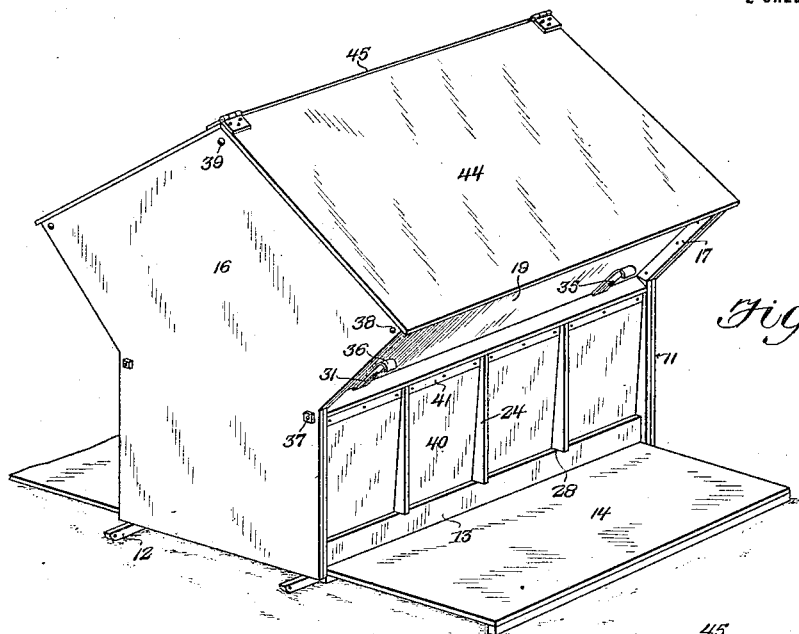

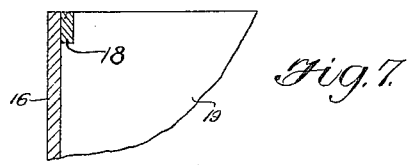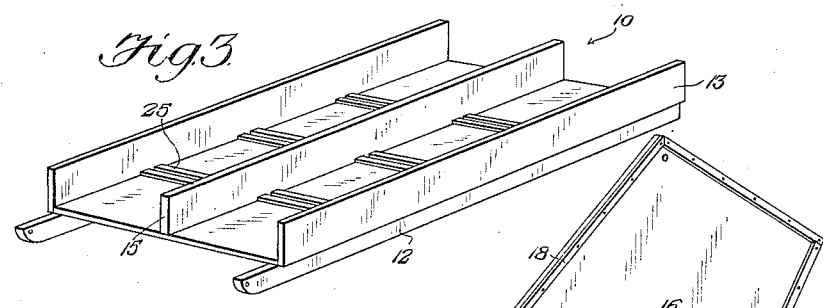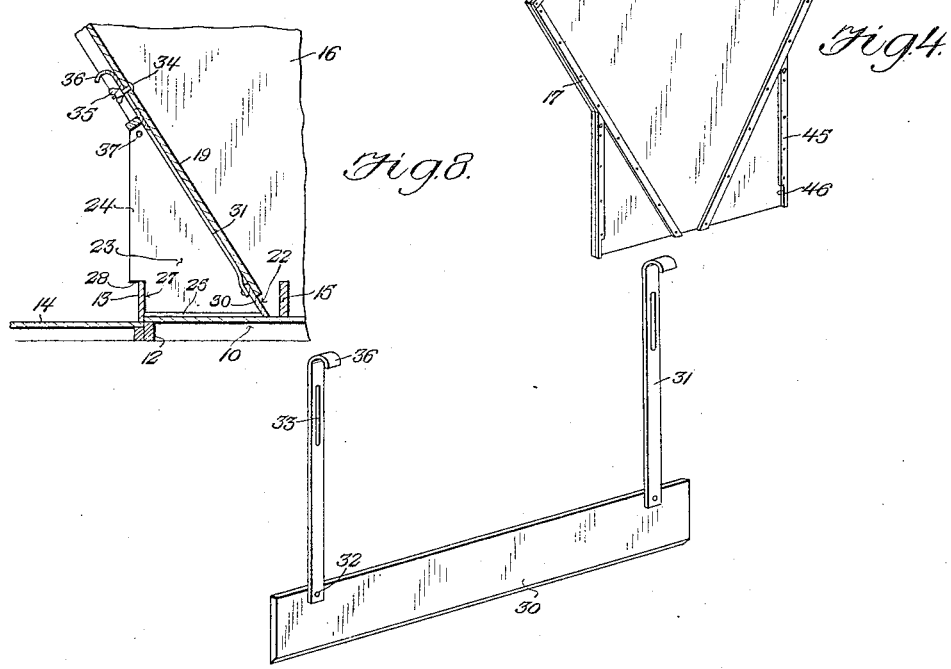

CHARLES E. BRETZ, OF HARRISVILLE, INDIANA.

FEED-TROUGH.

1,278,583.　　　　　Specification of Letters Patent.　　Patented Sept. 10, 1918.

Application filed April 20, 1918. Serial No. 229,829.

*To all whom it may concern:*

Be it known that I, CHARLES E. BRETZ, a citizen of the United States, residing at Harrisville, in the county of Randolph and State of Indiana, have invented new and useful Improvements in Feed-Troughs, of which the following is a specification.

This invention relates to troughs and is especially designed for the purpose of feeding hogs.

One of the objects of the invention is the provision of a trough of similar construction whose parts are interfitting and removably secured together, permitting of the same being compactly stored for shipment or separated for cleaning, thereby keeping the trough in a clean and sanitary condition.

Another object is to provide a novel form of means for regulating the passage of feed from the hopper to the various individual feeding compartments in which the trough is divided, permitting the passage to vary to the separate compartments, so that various kinds of feed may be used.

A further object of the invention is to provide a novel form of door or closure for each compartment, the said doors being mounted upon a rod also used to hold the parts assembled, the door being further disposed so as to normally hang at an angle from the perpendicular, thereby insuring its closing.

Other objects and advantages of the invention will appear when the following description is read in connection with the accompanying drawings, in which:—

Figure 1 is a perspective view of a feed trough embodying the present invention;

Fig. 2 is a transverse sectional view of the same, one of the doors of an individual feeding compartment being swung backward;

Fig. 3 is a detail perspective view of a bottom member or trough;

Fig. 4 is a similar view of one end wall;

Fig. 5 is a like view of one side plate;

Fig. 6 is a detail perspective view of one of the doors;

Fig. 7 is a detail sectional view on the line 7—7 of Fig. 2; and

Fig. 8 is a fragmentary vertical sectional view showing the connection between the bottom or trough and one of the removable partitions.

Referring to the drawings in detail the invention includes a bottom or trough 10 and a hopper 11, the latter being removably connected to the former.

The trough 10 is provided upon its end surface with runners 12 to space the bottom from the ground and by means of which the trough may be easily transported from place to place. Secured to the bottom 10 and to the runners 12 are side strips 13, which extend from end to end of the bottom, the bottom of these strips being slightly raised from the lower edge of the runners so as to provide a space for platform 14 upon which the animal may stand when feeding. This is especially useful for small animals such as young pigs. The trough is further provided with a longitudinally disposed strip 15 arranged centrally of the trough and when the hopper is in position this strip extends slightly upward into the bottom of the hopper to form a dividing board.

The hopper 11 comprises end walls 16, whose outline is shown in Fig. 1, these end walls having secured along their side and top edges cleats or flanges 17 and 18, the flanges 17 extending inwardly toward the bottom center and terminating in close proximity to the dividing board 15. The side walls 19 are adapted to be positioned within and raised against the flanges 17, the walls 19 being notched at their upper ends as shown at 20 for engagement beneath the flanges 18. The lower edge of the walls 19 terminate short of the bottom 10, so as to provide a passage 22 between the hopper and the trough, the dividing board 15 extending longitudinally and centrally of this passage and forming its rear wall. This prevents the feed animals upon one side from pushing food to the animals upon the opposite side.

The trough 10 upon each side of the hopper is divided into separate compartments 23 by means of removable partitions 24, the said partitions being arranged transversely of the trough and having their lower ends removably positioned between cleats 25 secured to the floor of the trough. The partitions are provided with an inclined edge, corresponding to the inclination of the side walls 19 of the hopper and these inclined side edges are removably received between cleats or strips 26 secured to the said side walls. The partitions are also cut away at one of their lower corners as at 27 to provide a shoulder 28 engageable over the upper edge of the side strips 13. Carried by the side walls 19 are longitudinally disposed strips 29, which engage and overhang the top of the partitions 24 and form a water shed to prevent the entrance of water into the top of the compartments 23. The strips 29 also serve to strengthen or stiffen the walls 19 and further act as a stop to space the lower edge of the said walls from the bottom of the trough for the purpose previously set forth.

The passage 22 between the interior of the hopper and the trough is regulated by means of a plate 30, one of these plates being provided for each of the side walls 19. The plates 30 are adjustably held in position through the medium of arms 31, which are pivotally secured to each end of the plates as at 32 and extend upward and are provided with slots 33 for the passage of bolts 34 which are carried by the walls 19. Winged ends 35 are positioned upon the threaded ends of the bolts 34, by means of which the plates 30 may be held in adjusted position. By mounting the plates pivotally upon the rods 31, they may be adjusted at an angle so that the size of the passages into the individual compartments 23 may vary. By this means different varieties of food may pass into each compartment. The strips 29 are notched to permit of the passage of the rods 31, which latter are provided upon their extremities with outwardly turned handles 36 for convenience of adjustment.

The various parts of the hopper are held in assembled position through the medium of rods 37 and 38 passing through the end walls and located respectively at the top of the separate feeding compartments and at the top of the side walls 19 and upon the outside of these walls, an additional rod 39 passing through the side walls at their apex. The partitions 24 are notched as shown at 40 for the reception of the plates 30, the notches being of sufficient length to permit of the adjustment of the plates.

Each of the separate compartments 23 is closed by a door 40, whose upper edge is provided with a plate 41 bent thereover to provide a passage 42 for the rods 37, so that in addition to holding the parts assembled, the said rods also serve as a pivot for hinging the doors 40 to the various compartments. The lower edge of the door is beveled as shown at 43, so that when it is swung to a closed position the food within the compartment 23 will not be dragged forward from the compartment and wasted. The relative locations of the rods 29 and the strips 13 are such that when the doors 40 are closed their lower ends will be slightly inclined inwardly, thereby insuring a proper closing and preventing the entrance of rain or snow within the compartments.

Openings may be provided at each end of the runners for the attachment of a chain or cable, by means of which the trough may be readily moved.

The top of the hopper is closed by complemental lids 44, which are hingedly secured together upon a rod 45, the said lids resting upon the upper inclined edges of each of the end walls 16, the weight of one lid being sufficient to prevent the accidental displacement of the other lid when filling the hopper. If desired both lids may be removed for this purpose.

When desired to take the hopper apart, the lids are removed and folded and the bolts 37, 38 and 39 removed, permitting the separation of the walls 18 and 19 and the removal of the doors 40 and the partitions 24. The various parts may then if desired be placed upon the trough 10 for storage or shipment.

For the purpose of holding the trough from lateral movement with respect to the hopper, the vertical side edges of the end wall 16 are provided with strips 45 which are notched at their lower ends as shown at 46 for engagement over the ends of the side strips 13.

By hinging the doors in the manner shown, the animal in feeding will cause the lower ends of these doors to strike against the lower portion of the side walls 19 of the hopper and cause food to pass downward into the separate feeding compartments. This does away with an agitator, which is usually employed for this purpose.

The invention is susceptible of various changes in its form, proportions and minor details of construction and the right is reserved to make such changes as will properly fall within the scope of the appended claim.

Having described the invention, what is claimed as new is:—

In a feed trough, the combination with a trough section, of a hopper removably secured thereto and including end walls, inwardly extending flanges secured along the side and top edges of said end walls, side walls removably positioned within and against the side flanges of the end walls and having corner notches engageable with the top flanges of said end walls, removable partitions dividing the trough into separate feeding compartments, rods engageable with said partitions and end walls and longitudinally disposed strips secured to the said walls and engageable with the tops of said partitions for strengthening the said side walls and holding their lower edges in spaced relation with respect to the bottom of the trough, the said strips also acting to shed the water from the separate feeding compartments.

CHARLES E. BRETZ.